United States Patent
Rentz

[15] 3,677,447
[45] July 18, 1972

[54] INTERCHANGEABLE TIP FOR DISCRETE DROPPING APPARATUS
[72] Inventor: John C. Rentz, Joppa, Md.
[73] Assignee: The United States of America as represented by the Secretary of the Army
[22] Filed: March 29, 1971
[21] Appl. No.: 128,842

[52] U.S. Cl. .......................................... 222/193, 222/420
[51] Int. Cl. ........................................................... B67d 5/54
[58] Field of Search ............... 222/420, 193; 73/429; 23/292; 261/30

[56] References Cited
UNITED STATES PATENTS
2,645,383   7/1953   Miller .................................... 222/193
3,554,450   1/1971   D'Muhala ............................. 222/193

*Primary Examiner*—Stanley H. Tollberg
*Attorney*—Harry M. Saragovitz, Herbert Berl, Edward J. Kelly and Bernard J. Ohlendorf

[57] ABSTRACT

An apparatus and method for dispensing accurate monodispersed aerosol droplets wherein a syringe, a dropping needle, a conduit needle, and a fluid supply are arranged in a combination to form a droplet of liquid on the tip of the dropping needle from the syringe and to blow the droplet off of the dropping needle to a receiver means by the fluid supply.

8 Claims, 2 Drawing Figures

Patented July 18, 1972
3,677,447
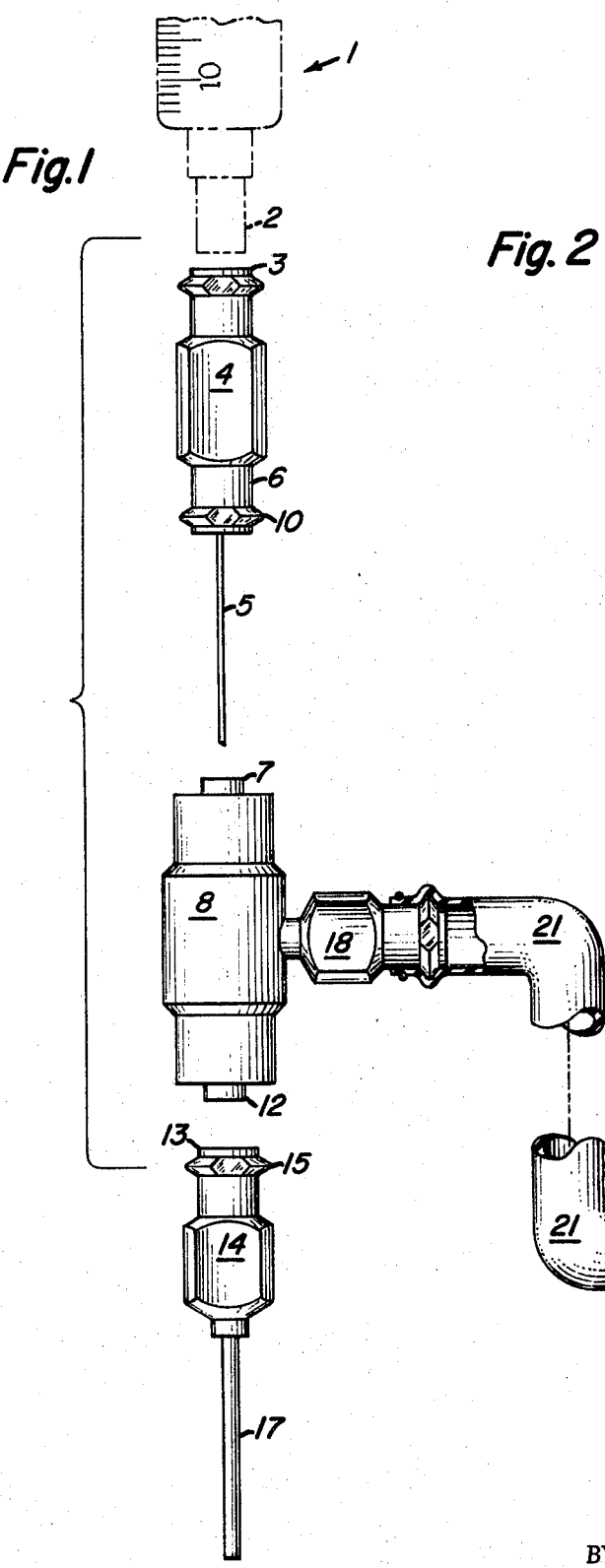
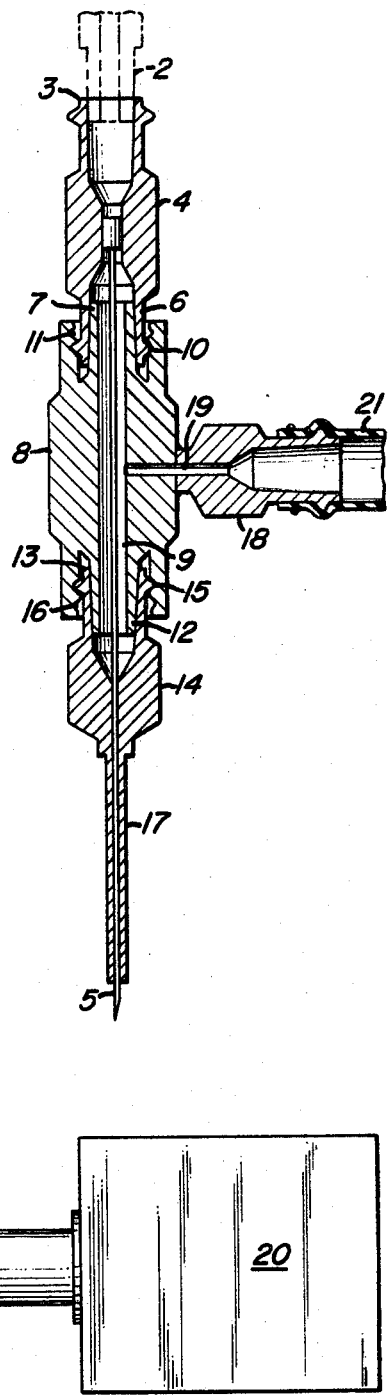
INVENTOR
John C. Rentz
Harry M. Saragovitz
Edward J. Kelly
Herbert Berl
BY Bernard J. Ohlendorf
ATTORNEYS

INTERCHANGEABLE TIP FOR DISCRETE DROPPING APPARATUS

DEDICATORY CLAUSE

The invention described herein may be manufactured, used, and licensed by or for the Government for governmental purposes without the payment to me of any royalty thereon.

My invention relates to an apparatus and method for dispensing precise, measured droplets of liquid and provides a convenient, accurate, and low cost dispensing means.

In conducting controlled laboratory animal and clothing tests, the need arose for an apparatus capable of dispensing accurate mono-dispersed aerosol droplets which could be readily and conveniently assembled and taken apart for cleaning or repairs and which permits interchangeability of various sizes of dispensing needles and syringes. A search for a commercially available apparatus was not fruitful, and my invention was conceived and reduced to practice to solve the dispensing problem and to satisfy the long felt need for an apparatus which could readily and conveniently be assembled and taken apart for dispensing accurate mono-dispersed aerosol droplets.

My invention has utility for any application requiring a dispensing means which can be readily and conveniently assembled and taken apart for accurately dispensing mono-dispersed aerosol droplets.

A principal object of my invention is to provide an apparatus and method for dispensing accurate mono-dispersed aerosol droplets.

Another object of my invention is to provide a dispensing apparatus which can be readily and conveniently assembled and taken apart for dispensing accurate mono-dispersed aerosol droplets.

A further object of my invention is to provide a dispensing apparatus for dispensing accurate mono-dispersed aerosol droplets which permit interchangeability of various size needles and syringes in combination with each other to suit any given dispensing requirement for micro or macro quantity.

Other objects of my invention will be obvious or will appear in the specification hereinafter set forth.

FIG. 1 is an exploded view of my dispensing apparatus.

FIG. 2 is a sectional view of my dispensing apparatus with the syringe and air tank omitted.

My invention as shown in FIGS. 1 and 2 will now be described in detail as follows.

Liquid to be dispensed is contained in any conventional syringe shown at 1, such as the syringe disclosed in U.S. Pat. No. 2,672,866; the syringe can have any capacity and graduations selectable within the skill of the art to suit any given dispensing application. Tang 2 of syringe 1 is inserted within end 3 of female adapter 4 to form a friction fit, liquid leak proof joint. Dropping needle 5 is fixedly connected within connector 4. While I used a number 27 gauge dropping needle in my application, the needle gauge is selectable within the skill of the art for any given application; the only criticality being that the gauge of the dropping needle must be compatible with the gauge of the subsequently described air conduit needle. End 6 of female adapter 4 is inserted over projection 7 of male adapter 8 so that needle 5 extends through conduit 9, as shown in FIG. 2, and male thread 10 is tightened within female threads 11 to form a liquid leak proof joint. Projection 12 of adapter 8 is inserted within female end 13 of conduit needle adapter 14 and male thread 15 is tightened within female threads 16 to form a liquid leak proof joint. Conduit needle 17 is fixedly connected to adapter 14 at the end opposite to 13, and adapter 18 is fixedly connected to and integral with adapter 8 at the center, as shown in FIGS. 1 and 2. While needle 17 can be of any gauge size compatible with dropping needle 5 and is selectable within the skill of the art, I used a number 18 gauge needle cut off square at the tip in my application. Channel 19 is provided through adapters 8 and 18 and connected with conduit 9, as shown in FIG. 2. Adapter 18 is connected to a conventional air or inert gas, such as nitrogen, tank 20 by conventional tubing 21, as shown in FIG. 1. Gas supply and pressure to my apparatus from tank 20 is controlled by a conventional valve and gauge means, not shown in the drawing, in the usual manner. To use my apparatus, syringe 1 is filled with the liquid to be dispensed in the conventional manner and the apparatus is assembled as described above. The plunger, not shown in the drawing, of the syringe is depressed by thumb pressure in the usual manner until a droplet of liquid forms on the tip of needle 5; the volume of liquid in the droplet being determined by the change in volume, as measured by the graduations, in the syringe. When a droplet has formed on the tip of needle 5, pressure is released on the syringe plunger, and a fluid, such as air or inert gas, such as nitrogen, is supplied from tank 20 through channel 19, conduit 9, and conduit needle 17 to blow the droplet off of needle 5 into any desired receiving means. In the above described manner, very minute quantities of liquid can be accurately dispensed. Optionally, a three way valve, not shown in the drawing, can be connected in the conventional manner between tang 2 and end 3 of adapter 4 to connect the syringe of a liquid reservoir, not shown in the drawing, to refill syringe 1 when empty.

It is obvious that other modifications can be made of my invention, and I desire to be limited only by the scope of the appended claims.

I claim:

1. An apparatus for dispensing accurate mono-dispersed aerosol droplets comprising a syringe means to contain the liquid to be dispensed; a female adapter means having a dropping needle integral therewith and a male thread means integral therewith and adapted to mate with a female thread means of a male adapter means, said female adapter means being adapted to connect in a friction fit with the syringe means to form a liquid leak proof joint; a male adapter means having female thread means formed in each end, a conduit means formed axially therethrough, and an adapter means integral with the male adapter means in the center thereof, said male adapter means being adapted to connect to the female adapter means and a conduit needle means in liquid leak proof joints; a needle conduit means having a male thread integral therewith, said needle conduit means being adapted to connect to the male adapter means in a liquid leak proof joint; a channel means formed in the adapter means integral with the male adapter means, said channel means being adapted to communicate with the conduit means and a tubing means adapted to connect to the adapter means integral with the male adapter means; a tubing means adapted to connect the adapter means integral with the male adapter means with a fluid tank means; and a fluid tank adapted to supply fluid to the conduit means, the channel means, and the conduit needle means.

2. The apparatus of claim 1 wherein the dropping needle is a number 27 gauge.

3. The apparatus of claim 2 wherein the conduit needle is a number 18 gauge and cut off square at the end.

4. The apparatus of claim 1 wherein the fluid is a material selected from the group of materials consisting of air and inert gas.

5. The apparatus of claim 5 wherein the inert gas is nitrogen.

6. A method of dispensing accurate mono-dispersed aerosol droplets comprising the steps of filling a syringe means with a liquid to be dispensed, connecting the syringe means to one end of a female adapter means having a dropping needle integral therewith by friction fit, connecting the female adapter means at the end opposite to the end connected to the syringe means to one end of a male adapter means, connecting a conduit needle means to the end of the male adapter means opposite to the end of the male adapter means connected to the female adapter means, connecting a fluid supply to the male adapter means to provide communication of the fluid supply with a conduit formed axially through the male adapter means, depressing a plunger means movably mounted within the syringe means until a droplet of the liquid within the syringe means forms on the tip of the dropping needle, releasing pressure on the plunger means, supplying fluid flow to the conduit needle means to blow the droplet of liquid off of the dropping needle to a receiver means, and blowing the droplet of liquid off of the dropping needle to a receiver means.

7. The method of claim 6 wherein the fluid supply contains a material selected from the group of materials consisting of air and inert gas.

8. The method of claim 7 wherein the inert gas is nitrogen.

* * * * *